United States Patent [19]

Ruhl

[11] 4,154,784

[45] May 15, 1979

[54] METHOD OF MOLDING A UNITARY FOAMED CORE PLASTIC HINGED ARTICLE

[75] Inventor: Edward A. Ruhl, Southfield, Mich.

[73] Assignee: USM Corporation, Farmington, Conn.

[21] Appl. No.: 898,176

[22] Filed: Apr. 20, 1978

Related U.S. Application Data

[62] Division of Ser. No. 759,256, Jan. 14, 1977.

[51] Int. Cl.² .............................................. B29D 27/00
[52] U.S. Cl. ..................... 264/45.5; 264/54; 264/68; 264/328; 264/DIG. 5; 264/DIG. 14; 264/DIG. 16; 264/DIG. 83; 425/552; 425/577; 425/817 R
[58] Field of Search .............. 264/45.5, DIG. 83, 321, 264/68, 328, DIG. 14, DIG. 5, 59, DIG. 16; 428/159; 425/552, 577, 817 R

[56] References Cited

U.S. PATENT DOCUMENTS

| | | | |
|---|---|---|---|
| 3,058,161 | 10/1962 | Beyer et al. | 264/DIG. 83 |
| 3,222,437 | 12/1965 | Schilling | 428/159 X |
| 3,767,742 | 10/1973 | Robin | 264/DIG. 83 |
| 3,776,989 | 12/1973 | Annis et al. | 264/DIG. 83 |
| 3,876,494 | 4/1975 | Ogawa et al. | 428/159 |
| 3,937,447 | 2/1976 | Alwes et al. | 264/DIG. 83 |
| 3,953,560 | 4/1976 | Klein | 264/DIG. 83 |
| 4,097,571 | 6/1978 | Cox | 264/328 X |

*Primary Examiner*—Philip Anderson
*Attorney, Agent, or Firm*—Aubrey C. Brine; Richard B. Megley; Vincent A. White

[57] ABSTRACT

Unitary molded plastic hinged article and method of making in which a fluid molten mixture of heat softenable resin and a blowing agent in substantially unfoamed condition is introduced into an expandable mold cavity to fill the cavity and the mold is expanded to allow foaming of the resin to form at least one foam cored article section while the resin adjacent the mold surface is still fluid and in which the hinge structure is formed by a member adapted to form a thin, flex portion and portions transitional from the thickness of the flex portion to the thickness of a cored article section, the shaping member being slidably disposed in an aperture in the mold with portions of the walls of the aperture exposed within the mold cavity at the time the molten mixture is introduced and the exposed portions of the walls being wiped by the shaping member when the mold is expanded. Cooling of the mixture by the mold prevents development of blowing gas for expansion of the resin adjacent the mold and shaping member to provide an unfoamed surface for the article and an unfoamed flex portion of the hinge structure with a progressive increase in central foam in the transitional portions from the flex portion to the cored article sections.

4 Claims, 5 Drawing Figures

METHOD OF MOLDING A UNITARY FOAMED CORE PLASTIC HINGED ARTICLE

This is a division of application Ser. No. 759,256, filed Jan. 14, 1977.

FIELD OF THE INVENTION

This invention relates to a method of making a unitary molded plastic hinged article in which hinged article sections have a foam core.

BACKGROUND OF THE INVENTION

Integrally hinged panels have been fabricated of certain plastic materials such as polypropylene by thinning a section of the part and flexing the part immediately after molding along the thinned section to orient the molecular structure and forming a durable flex portion. Frequently, the flex portion of the hinge is indefinite since the comparatively low flexural modulus allows additional flexing between the mounting points of the integrally hinged panel and its mounting surface. Solutions to this problem have included the addition of reinforcement ribs, metal reinforcement members or increased thickness of panel sections in areas immediate adjacent the flex portion.

It has also been proposed to make hinged articles of which the panels have foam cores with unfoamed surfaces, the foam cored panel surfaces being connected by a hinge of unfoamed material. To form such articles an expandable mold has been filled with a foamable composition containing a thermoplastic polymeric material and a blowing agent and expanding the panel forming portions of the mold while holding a hinge defining mold component to prevent foaming in a hinge portion. This process has required that the hinge forming member of the mold have substantially straight sides in order to avoid surface irregularities at the juncture between the hinge forming member and the panel forming portions of the mold. That is, in the procedure heretofore suggested in which the surface portions of the thermoplastic material in the mold are chilled before expansion of the mold, any hinge forming structure other than a straight sided member would generate solidified sections not capable of coalescing homogenously into the panel sections and would form irregular juncture portions having unsatisfactory appearance and forming lines of stress concentration tending to weaken the article.

OBJECT OF THE INVENTION

It is an object of the present invention to manufacture a unitary molded plastic hinged article in which panel sections have unfoamed surfaces and foam cores are connected by a hinge structure including an unfoamed flex portion and transitional portions of which the walls are divergent and the cores have progressively increasing thicknesses of foam in central portions.

SUMMARY OF THE INVENTION

The subject invention provides a method of manufacturing a unitary molded plastic hinged article in which a fluid molten mixture of heat softenable resin and a blowing agent is introduced into an expandable mold cavity under conditions effective to fill the cavity with the mixture in unfoamed condition but at the foaming temperature, the mold is expanded in panel forming sections to form foam cored article sections while the resin adjacent the mold surface is still fluid and a hinge shaping member is held in position to form a thin unfoamed flex portion and diverging wall transitional portions of which there is a progressive increase in central foam thickness from substantially none adjacent the flex portion to a thickness approaching the thickness of the foam core in the panels.

DRAWINGS

The invention will be described in connection with the drawings forming part of the disclosure of the present invention in which.

Figure 3:
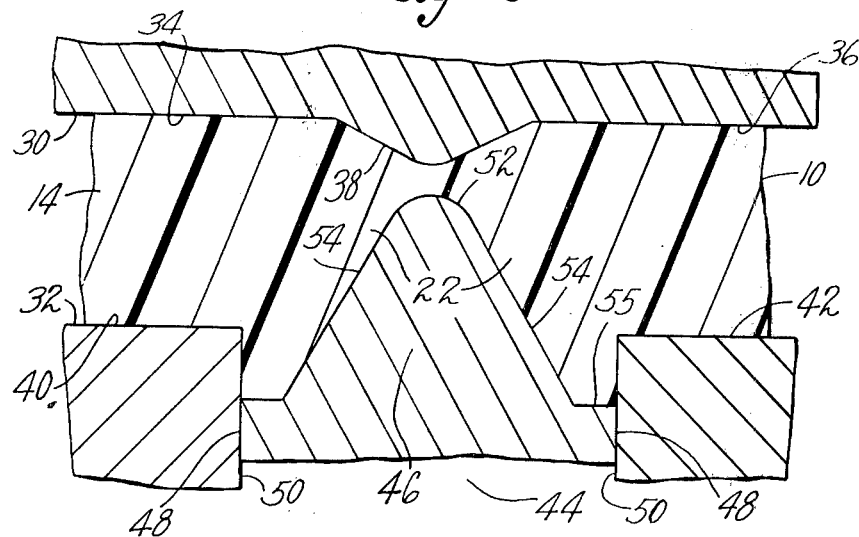
FIG. 3 is a sectional view on an enlarged scale and with parts broken away showing the relation of panel forming mold parts and hinge structure shaping member at the time of injection of a fluid molten mixture of heat softenable resin and blowing agent into the mold cavity.
Figure 4:
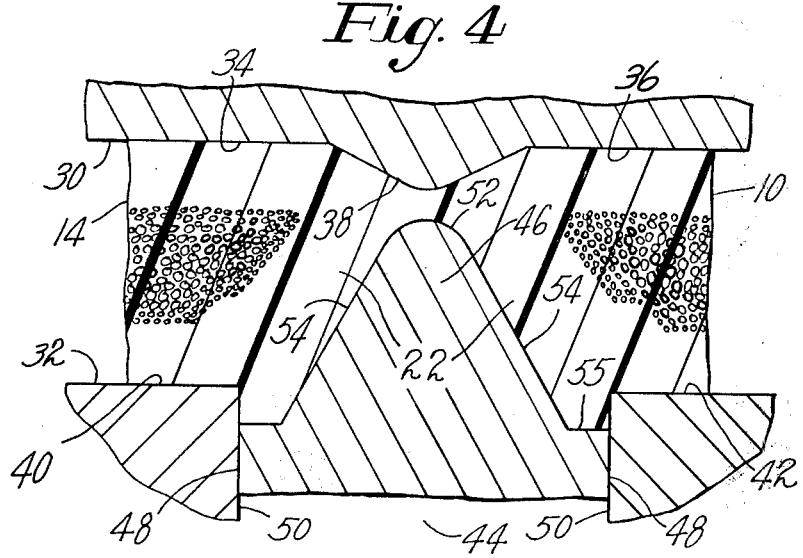
Figure 5:
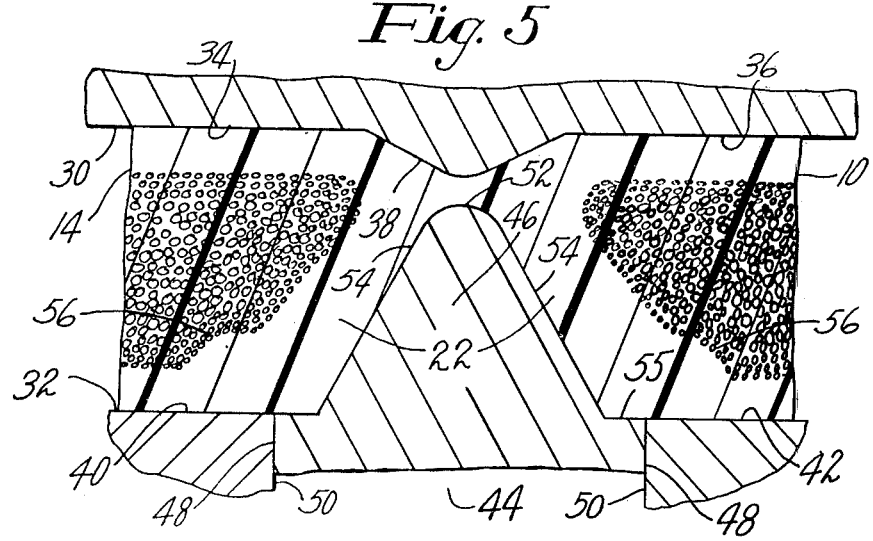

FIG. 4 is a sectional view similar to FIG. 3 but showing the relation of the panel forming sections of the mold and the shaping member at an intermediate point in the expansion of the mold and also showing the development of foam at the transitional portion; and FIG. 5 is a view on an enlarged scale similar to FIGS. 3 and 4 showing the relation of the panel forming members and the shaping member of the mold on completion of expansion of the mold and showing the distribution of foamed core sections in the polymeric material in the panel sections and in the mold structures.

DESCRIPTION OF THE PREFERRED EMBODIMENTS

Figure 1:
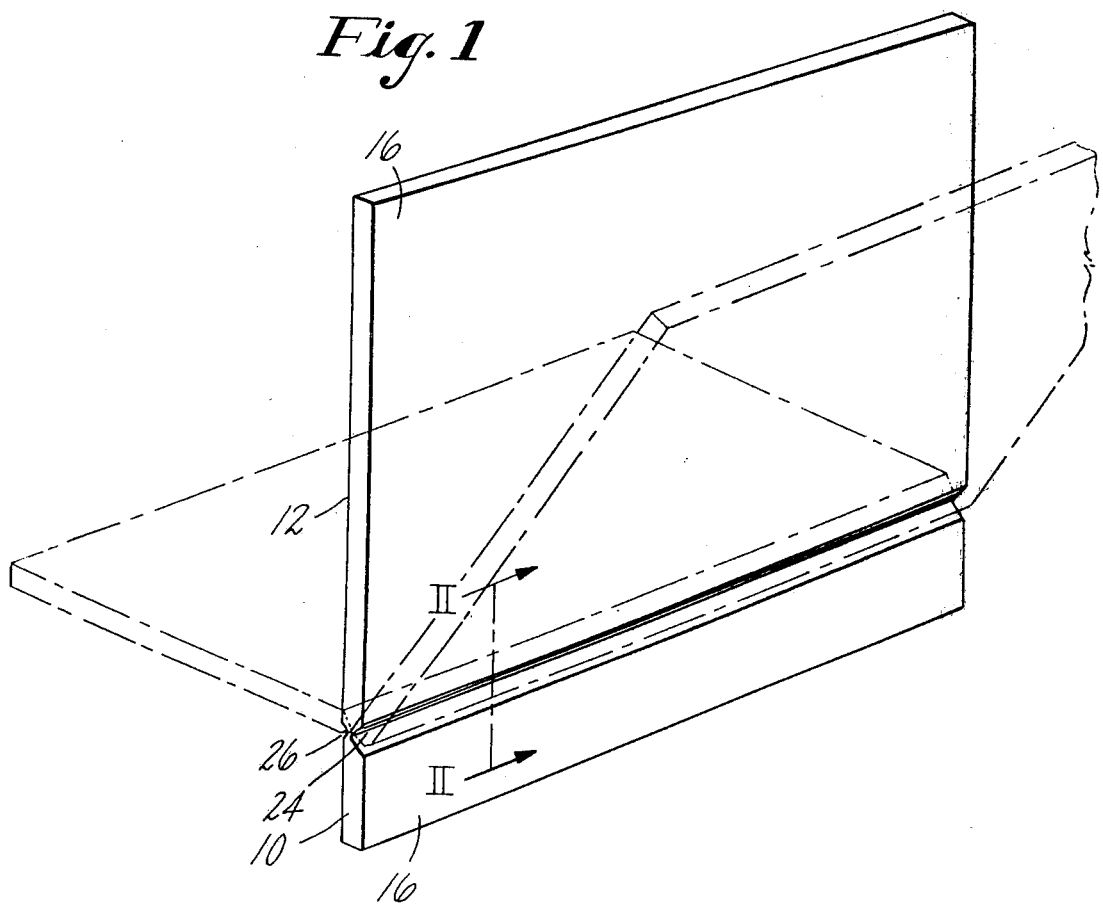
FIG. 1 is an angular view of a unitary molded hinged article showing in broken lines the position of one panel relative to another after swinging on the hinge portion.

As shown in FIG. 1, the article of the present invention is a unitary molded plastic article including sections 10 and 14 of substantial thickness of which at least one and preferably each has a foamed plastic core 14 and has substantially unfoamed surfaces 16 at the opposed faces 17, the sections being joined for angular swing relative to each other by a hinge structure 18 integral with the sections. The hinge structure includes a thin unfoamed narrow flex portion 20 preferably displaced from the neutral axes of the thick sections to a plane adjacent the plane of the surfaces 16 on one side of the article and transitional portions 22 progressively increasing from the thickness dimension of the flex portion 20 to the thickness dimensions of the article sections 10 and 14. As shown, the surfaces 24 of the transitional portions 22 are unfoamed and diverge on the side of the article opposite that to which the flex portion was displaced to form a notch which may be V-shaped. Desirably, there is also providing a shallower recess 26 which may also be a V-shape at the sides of the flex portion on the face of the article toward which the flex portion has been displaced.

Figure 2:
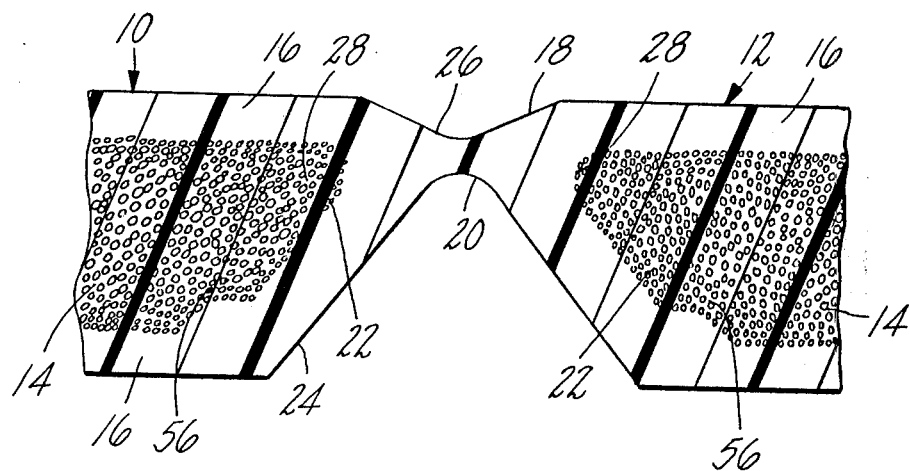
FIG. 2 is a sectional view on an enlarged scale taken on the line II—II of FIG. 1 showing the distribution of foamed polymeric material in the hinge structure and in adjoining panel sections.

As shown more clearly in FIG. 2, the flex portion 20 itself is unfoamed and the transitional portions 22, that is the portions on each side of the flex portion 20, are substantially unfoamed adjacent the flex portion but have centrally foamed portions 28 of which the thickness is progressively greater as they approach the article sections 10 and 12 and have a thickness dimension approaching the thickness dimension of the foamed cores 14 of the article sections 10 and 12 at the juncture between the hinge structure 18 and the article sections.

This structure offers the important advantage of sharp increase in stiffness away from the flex portion 20 because of the rapid increase in thickness. Also, by reason of the substantially unfoamed core sections adjacent the flex portion, the portions immediately adjacent the flex portion 20 have high strength and stiffness while portions farther from the flex portion have higher stiffness by reason of the unfoamed surface portions 24, being spaced from each other providing mechanically superior resistance to bending. A further important factor is the progressive increase in the thickness of the foamed central portions 28 in these transitional portions which avoids localizing stress which might tend to develop fractures at points of stress concentration.

The process of the present invention which is effective to produce the molded plastic article with the novel hinge structure makes use of the combination of the steps of filling an expandable mold cavity with a fluid molten mixture of heat softenable organic polymeric resinous material and a blowing agent under conditions such that the mold cavity is filled so rapidly with the fluid mixture in unfoamed condition but at the foaming temperature of the mixture that the mold is filled as shown in FIG. 3 before portions of the mixing in contact with the walls of the mold have solidified and that the mold is expanded to allow foaming of the core in expanding portions of the mold without the development of surface discontinuities which might otherwise occur.

The expandable mold employed comprises opposed mold sections 30 and 32 which are relatively movable from an initial position as shown in FIG. 3 for filling to a final position shown in FIG. 5 in which the mold cavity is enlarged to allow expansion of the material which has been filled into the mold. In the structure shown, one of the mold sections 30 is stationary and includes two inner wall sections 34 and 36 for molding the faces 17 of two article sections 10 and 12 and a shallow ridge section 38 between them for forming a shallow notch 26 in the molded plastic material between the two article sections 10 and 12.

The second or movable mold section 32 includes two inner wall sections 40 and 42 for molding the other faces of the article sections 10 and 12, these wall sections 40 and 42 being separated by an aperture 44 in which is disposed a hinge structure shaping member 46 having side walls 48 in close sliding fit with the walls 50 of the aperture. This hinge shaping member 46 presents a rounded narrow surface portion 52 for molding the flex portion 20 of the hinge structure, the surface portion 52 being disposed opposite the ridge 38 on the stationary mold surface 30, diverging surface portions 54 sloping away from the stationary mold surface for forming the sloping surfaces 24 of the transitional portions 22 of the hinge structure 18 and optional further diverging surface portions 55, parallel to the surfaces of mold wall sections 40 and 42. The diverging surface portions meet the walls 50 of the aperture 44 of the movable mold member 32 along the lines which are spaced inward from the surface of the mold wall sections 40 and 42 suitably a distance equal to the distance that the movable mold wall sections 40 and 42 will travel in the course of expanding the mold. As shown in FIG. 3, this relation of the shaping member 46 and the aperture 44 leaves portions of the walls 50 of the aperture exposed within the mold cavity at the time that plastic material is first filled into the mold, and when the movable mold wall 32 has been operated to expand the mold, this shaping member 44, which is held in spaced relation to the stationary mold surface 30, is effective to wipe plastic material away from initially exposed portions of the aperture walls 50.

The angle between the diverging surface portions 54 of the shaping member 46 is limited by the hinge dimensions and the distance the mold sections 30 and 32 are to be moved apart to expand the mold cavity. That is, the position of the narrow surface portion 52 is determined by the desired thickness of the flex portion 20, and the surface portions 54 will preferably diverge at an angle not greater than would cause these portions to engage the walls 50 of the aperture 44 along lines spaced inwardly from the first inner wall sections 40 and 42 a distance corresponding to the distance the wall sections 40 and 42 will travel in expanding the mold cavity.

Filling of the mold in the process of the present invention is preferably effected using a procedure such as described in more detail in U.S. Pat. Nos. 3,776,989 and 3,801,686 in which a mixture of polymeric material and a blowing agent is plasticated and brought to a temperature maintained below the foaming temperature of the resinous material-blowing agent system and is then rapidly injected through a flow resisting zone into the mold cavity. The rate of injection is coordinated with the initial temperature of the mixture and the resistance to flow of the zone to frictionally generate in the mixture passing through the zone the increment of heat needed to raise the temperature of the mixture to the foaming temperature when the mixture enters the mold cavity and to fill the mold cavity with the molten mixture during the induction period before substantial development of gas by the blowing agent. By reason of this rapid injection of the material in unfoamed condition, the mold cavity is filled before solidification of the resin at the mold surfaces so that the material adjacent the inner wall sections 34, 36, 40 and 42 of the mold cavity and adjacent the shaping member 46 is in substantially unfoamed condition and is cooled without hardening substantially to prevent foaming in these portions during the subsequent step of expanding the mold. The term "unfoamed surface portions" is used in this specification and claims to define the cell free structure shown in FIGS. 2, 4 and 5 of the drawings resulting from cooling of the as yet unfoamed but foamable composition by the walls of the mold cavity to prevent foaming during the step of expanding the mold and to exclude surfaces composed of the cell walls of foamed material.

Polypropylene is the preferred plastic material for use in the hinged article and method of making it according to the present invention because of its outstanding flexing properties as a hinge. However, other plastic materials such as ethylene propylene copolymers, polyethylene, polymers and copolymers of vinyl chloride, polyurethanes, natural rubber, and synthetic polymer and copolymer elastomers.

Any of the usual blowing agents for foaming plastic materials may be used such as azodicarbonamide, p,p'-oxbis (benzene sulfonyl hydrazine), p-toluene sulfonyl semicarbazide, trihydrazinotriazine, "AZOCH"-hydrazine derivative and modified trihydrazinotriazine from Fisons, England.

It will be understood that blowing agents are matched with resins and that selection of the foaming temperature most satisfactory to form a well foamed resin in determinable as explained in more detail in U.S. Pat. No. 3,776,989. That patent also explains in more detail selection of injection conditions effective to enable filling of the mold with the mixture of plastic material and blowing agents at the foaming temperature of the system but without foaming until the mold is filled.

It is a particularly important advantage of the present process that expansion of the mold is effected before complete hardening of the resinous material adjacent the inner wall sections 40 and 42 and shaping member 46 within the mold cavity which enables the resinous material wiped from the aperture walls 50 by the shaping member 40 to coalesce with other resin in the mold cavity. That is, referring to FIGS. 3, 4 and 5, while the resin adjacent the exposed walls 50 of the aperture 44 and of the shaping member 46 is reduced to a temperature which prevents foaming, the resin still remains fluid so that as the resinous material is wiped from the aperture walls 50, it flows into and coalesces with resin at the juncture between the hinge structure 18 and the article section 10 and 12, (note particularly FIGS. 4 and 5) and merges honogeneously with that resinous material to form a rounded thickness 56 of unfoamed material at that juncture.

The following Example is given to aid in understanding the invention but it is to be understood that the invention is not restricted to the particular procedures, structures, materials or the like;

EXAMPLE

Polypropylene granules having a density of 0.90 g. per cc. and a Vicat softening point of 150° F. were dusted with 1.5% of azodicarbonamide (Uniroyal AZ NP 199) blowing agent based on the weight of the polypropylene. The mixture was melted in an injection molding plasticator at a barrel temperature of 400° F. and a pressure of 200 p.s.i. so that it was maintained below the foaming temperature. The plasticated material was injected at an injection pressure of 1500 p.s.i. through a restricted cross-section passageway having a diameter of 0.1875 and a length of 3.00. The injection time was 4 seconds to fill a mold cavity maintained at 20° F. The mold cavity was expandable and included opposed inner walls including a stationary wall having two areas for forming the surfaces of panel section separated by a shallow ridge, and a movable section having two areas for forming the opposite surfaces of the panel sections separated by an aperture in which was disposed a hinge structure shaping element. The panel section, forming areas, shallow ridge and hinge shaping members were in the relation generally shown in FIG. 3. At the time of injection, the opposed inner walls were spaced a distance of 0.140" and the narrow portion of the shaping member was spaced 0.020" from the crest of the shallow ridge. The overall dimension of the mold cavity excluding the shallow ridge and shaping member were 9.5" in a direction parallel to the hinge structure and 9.5" in a direction at right angles to the hinge structure. The diverging walls of the shaping member were at an angle of 80° to each other and the edges of those diverging sections met the walls of the aperture 0.045" from the surface of the movable inner wall. The temperature of the material entering the mold after passing the restricted cross-section passageway was 440° F., a temperature increase of 40° F. which brought the mixture of polypropylene and blowing agent up to the foaming temperature. Upon filling the mold cavity, the mold cavity was expanded while the polypropylene was still fluid by moving the mold member to increase the space between the panel forming surfaces 0.045" further apart while maintaining the hinge structure shaping member in the same relation to the crest of the shallow ridge. After allowing the polypropylene to solidify, the mold was opened, the molded article withdrawn and the panel sections were swung relative to each other to orient the molecular structure to develop hinge action at the flex portion. The molded article was sectioned and it was found that the flex portion was substantially unfoamed, that foam developed in progressive thickness centrally in the transitional portions of the hinge structure from substantially no foam adjacent the flex portion to a thickness approaching the thickness of the foamed core of the panel at the juncture between the hinge structure and the panel sections. All surfaces of the molded article were unfoamed and the juncture between the portion of the article formed by the hinge shaping member and the portions formed by the panel forming walls of the mold was smooth. Interiorly of the molded article at this juncture, it was found that there was a smoothly rounded thickness of unfoamed material coalescing with and uniformly merged with surrounding material indicating that this material was still fluid although cooled to prevent foaming at the time it was wiped from the walls of the aperture by the shaping member.

Having thus described my invention, what I claim as new and desire to secure by Letters Patent of the United States is:

1. The process for molding a unitary article having sections joined for angular swing relative to each other by an integral hinge structure including a narrow flex portion of thin cross section and transition portions increasing in thickness from the thickness of said flex portion to the thickness of said article sections, said process comprising forming a fluid molten mixture of heat softenable organic polymeric resinous material and a blowing agent, filling an expandable mold cavity with said mixture in substantially unfoamed condition but at the foaming temperature of said mixture, the temperature of the inner walls of said cavity being below said foaming temperature to prevent foaming of resin adjacent said walls but not so cold as to harden the portion of the mixture which contacts said inner walls prior to increasing the volume of said mold cavity, said mold cavity being defined at least in part by a first inner wall having an aperture separating wall areas for forming one face of each of said article sections, a hinge structure shaping member with side walls in close sliding fit with walls of said aperture, and a second inner wall opposed to and spaced from said shaping member and said first inner wall for forming surfaces on the other faces of each of said article sections, said shaping member including a narrow surface portion for forming said flex portion and diverging surface portions for forming said transition portions sloping away from said second inner wall and meeting walls of said aperture along lines spaced inward from the surface of said first inner wall so that portions of the walls of said aperture are exposed within said mold cavity, moving said first inner wall relative to said shaping member and said second inner wall after filling said mold cavity and while the mixture in contact with said inner walls is still fluid to increase the volume of said mold cavity but holding said shaping member with its narrow surface portion spaced from said second inner wall a distance corresponding to the desired thickness of the flex portion of said hinge, foaming central portions of resinous material between and spaced from said opposed inner walls to form foam cored article sections with unfoamed surface portions, foaming to a progressive extent central portions of the thickness of resinous material between said diverging surface portions of said hinge shaping member and said second inner wall to form said transitional portions, said foaming in said transitional portions increasing from substantially none adjacent said flex portion to a foam core thickness adjacent said article sections approaching the thickness of foam core of said article sections, preventing substantial foaming of resinous material in the area between said narrow surface portion of said shaping member and said second inner wall to form a substantially unfoamed flex portion, wiping resinous material from said exposed wall portions of said aperture by said movement of said shaping member relative to said inner wall to cause it to flow into and coalesce with resin in said mold cavity, and thereafter cooling said resinous material to solidify it.

2. The process for molding a unitary article having sections joined by an integral hinge structure as defined in claim 1 in which said molten mixture is below the foaming temperature of the resinous material-blowing agent system prior to being filled into said mold cavity and is brought to foaming temperature by injecting a mass of said molten mixture through a flow-resisting channel into said mold cavity at a rate coordinated with the initial temperature of the mixture and resistance to flow of the mixture through the channel to generate by viscous dissipation in the mixture flowing through the channel, the increment of heat to raise the temperature of said mixture to said foaming temperature when the mixture enters the mold cavity and to fill said molding cavity before substantial foaming of said mixture occurs.

3. The process for molding an article as defined in claim 2 in which portions of said shaping member project into the cavity beyond said first inner wall at the beginning of the injection.

4. The process for molding an article as defined in claim 2 in which said shaping member includes a narrow portion near said other inner wall section and surface portions sloping outward from said narrow portion in a direction away from said other inner wall section.

* * * * *